United States Patent [19]

Nohtomi

[11] Patent Number: 4,796,091
[45] Date of Patent: Jan. 3, 1989

[54] FACSIMILE APPARATUS

[75] Inventor: Hiroshi Nohtomi, Yokohama, Japan

[73] Assignee: Aisin Seiki Co., Ltd., Kariya City, Japan

[21] Appl. No.: 9,163

[22] Filed: Jan. 30, 1987

[30] Foreign Application Priority Data

Jan. 30, 1986 [JP] Japan .................................. 61-018726

[51] Int. Cl.$^4$ .............................................. H04N 1/04
[52] U.S. Cl. ...................... 358/256; 358/280; 358/286
[58] Field of Search ........................ 358/280, 256, 286

[56] References Cited

U.S. PATENT DOCUMENTS 3,527,882 9/1970 Brouwer et al. .................... 358/286
4,652,933 3/1987 Koshiishi .............................. 358/286

Primary Examiner—Edward L. Coles, Sr.
Attorney, Agent, or Firm—Sughrue, Mion, Zinn, Macpeak, and Seas

[57] ABSTRACT

A facsimile apparatus which temporarily stores a document received and realizes selective printing as required. This apparatus comprises a communication terminal, a modem, a memory which stores received information demodulated by the modem, a display which displays such received information, a recording device which records such received information and a switch which selects driving of the memory, display and/or recording device. With this apparatus received information is once stored in the memory and is selectively recorded as required by the recording device after confirmation of the contents of the received information with the display.

18 Claims, 8 Drawing Sheets

FACSIMILE APPARATUS

FIELD OF THE INVENTION

The present invention relates to a facsimile apparatus which receives a facsimile signal and stores the facsimile signal in a memory for selective readout by a visual display means or a printing means wherein the apparatus is adapted to be installed in a moveable premise such as an automobile.

BACKGROUND OF THE INVENTION

Facsimile apparatus having some some similarities are disclosed in Japanese published patent application No. 50-9525 and in a paper entitled "A 200 Facsimile Electronic Mail", reported by M. Ohtsuka, H. Kobayashi, R. Iguchi and H. Takenouchi at the National Meeting of Japan Academic Society of Electronics and Telecommunications, 1985.

The apparatus disclosed in said application provides for the reception of a light and shade information signal which indicates light and shade of a document to be transmitted and a facsimile signal to be modulated including a periodical phase lock pulse which indicates the scanning rate at the sending side. These signals are received and demodulated, said demodulated output is received and recorded and simultaneously such demodulated output is applied to an adding type voltage controller and it is added to a DC reference voltage being applied to said controller, said added output is then applied to a DC motor for receiving scanning and thereby the scanning rate is controlled in accordance with light and shade of document to be transmitted, and moreover provides the function for starting the running of one scanning with the falling edge of the phase lock pulse to be received, changing the scanning rate during one scanning period conforming to the light and shade information signal to be received and then suspending the relevant one scanning at the front edge of the incoming phase lock pulse and making an advancement of one step of running in the subscanning.

In the disclosure of the application a readout scanning corresponding to a record and print scanning occurs on a one-to-one basis and the readout information is completely output after recording and printing. In the case of moveable premises such as a vehicle mounting the apparatus of this type from which a driver is often absent for various reasons, it can be predicted that a number of messages will be received and printed which contain useless information. Since the recording paper for such useless printing must always be provided, the recording paper housing space must be very large and a problem occurs in providing the space for such a purpose.

The facsimile apparatus disclosed in the Ohtsuka et al paper immediately stores the received information in a memory when a draft of facsimile electronic mail has been accepted and such information is then distributed after it is completely received. This facsimile apparatus is used for management of a large scale communications system mainly for rationalization of communication system with a charging system and statistical processing. Such an apparatus raises problems due to the restrictions on space and price and due to the difference in the amount of communications for an office system and a vehicle system.

SUMMARY OF THE INVENTION

The present invention has been proposed to solve such problems of the prior art and therefore, it is an object of the present invention to provide a facsimile apparatus which temporarily stores documents received and selects the printing as required from such documents.

A facsimile apparatus of the present invention comprises a radio or wireless communication terminal, a modem, a memory means which stores received information demodulated by said modem, a display means which displays said received information, a recording means which records said received information and a switch means which selects driving of said memory means, display means and/or recording means.

According to the present invention, the information received by the radio or wireless communication terminal is temporarily stored in the memory means and then confirmed by the display means as required. Thereafter, the recording means is set to the operating condition. Therefore, uneconomical use of recording paper, etc., by the recording means can be minimized. In addition, the memory means which stores received information and display means consume less electrical power and therefore total power consumption can be decreased.

The novel features which are believed to be characteristic to the invention, both as to organization and method of operations, together with further objects and advantages thereof, will be better understood from the accompanying drawings in which preferred embodiments of the invention are illustrated by way of example. It is to be understood, however, that the drawings are for the purpose of illustration and description only and are not intended as a definition of the limits of the invention.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
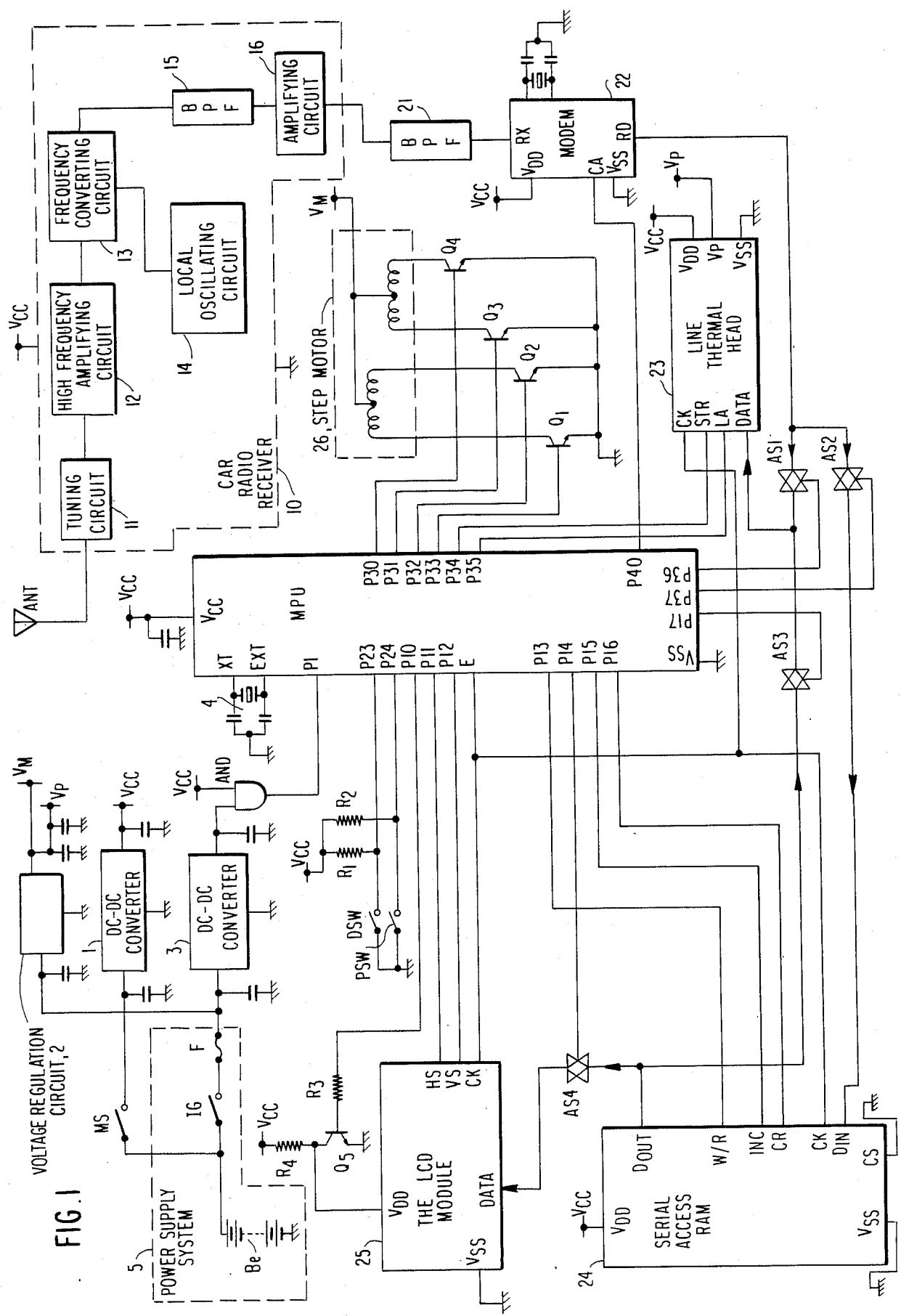
FIG. 1 is a circuit diagram for a facsimile apparatus in a preferred embodiment of the present invention.
Figure 2:
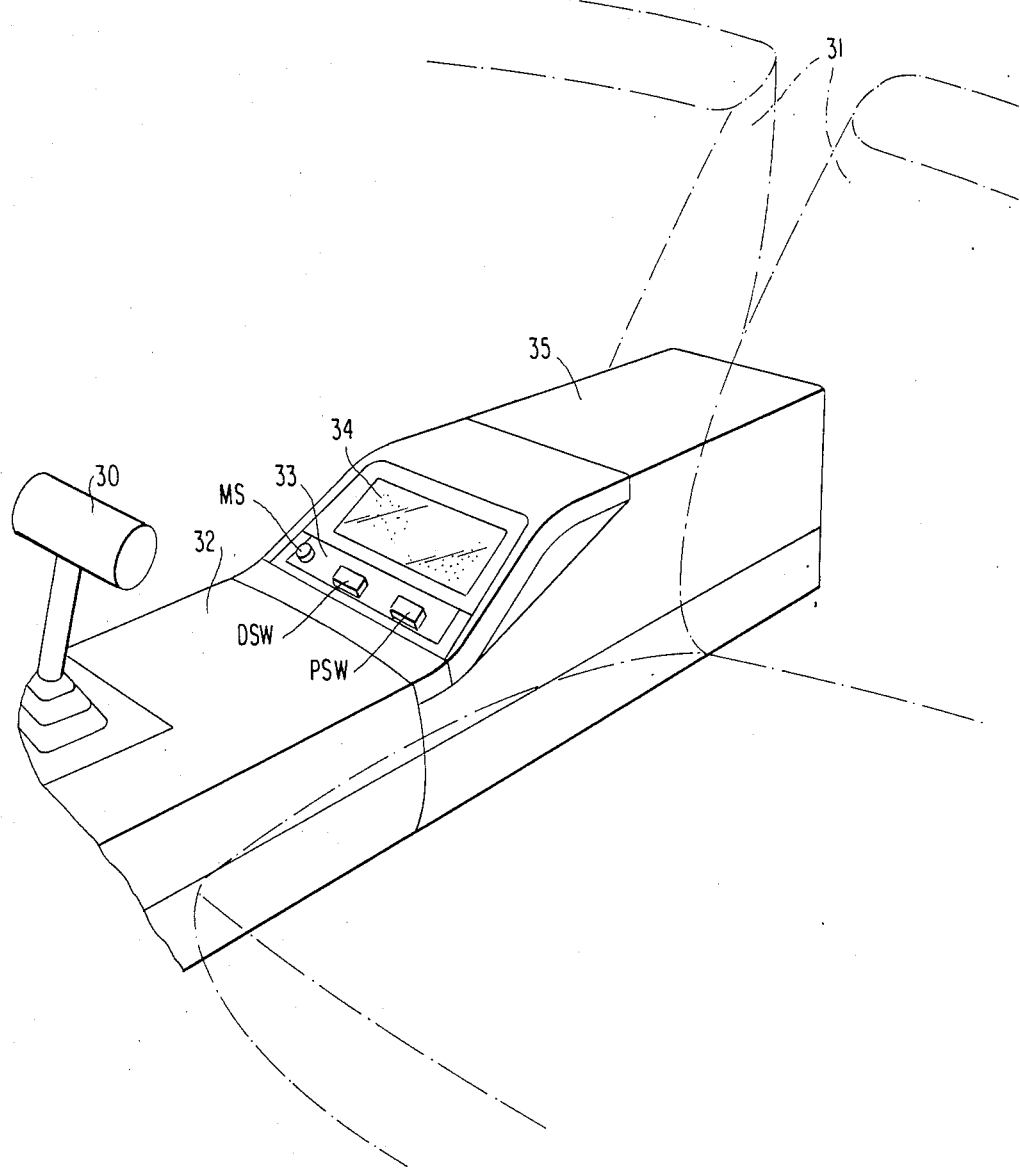
FIG. 2 is a perspective view which illustrates the installation of a facsimile apparatus according to the present invention mounted in a vehicle.
Figure 3:
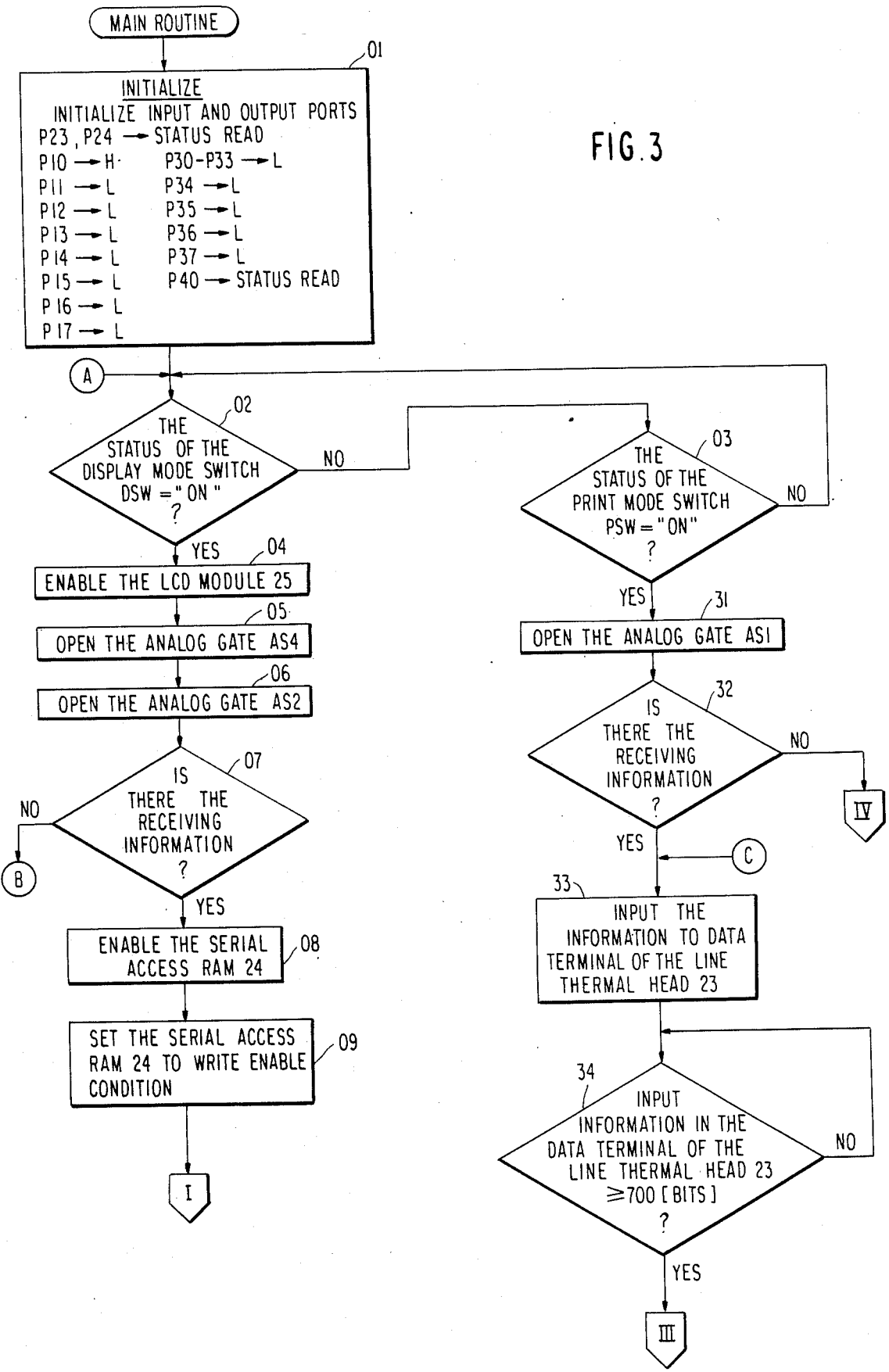
FIGS. 3 to 7 are flow charts of the "main routine" of microcomputer MPU which is employed for controlling the facsimile apparatus of the present invention.
Figure 4:
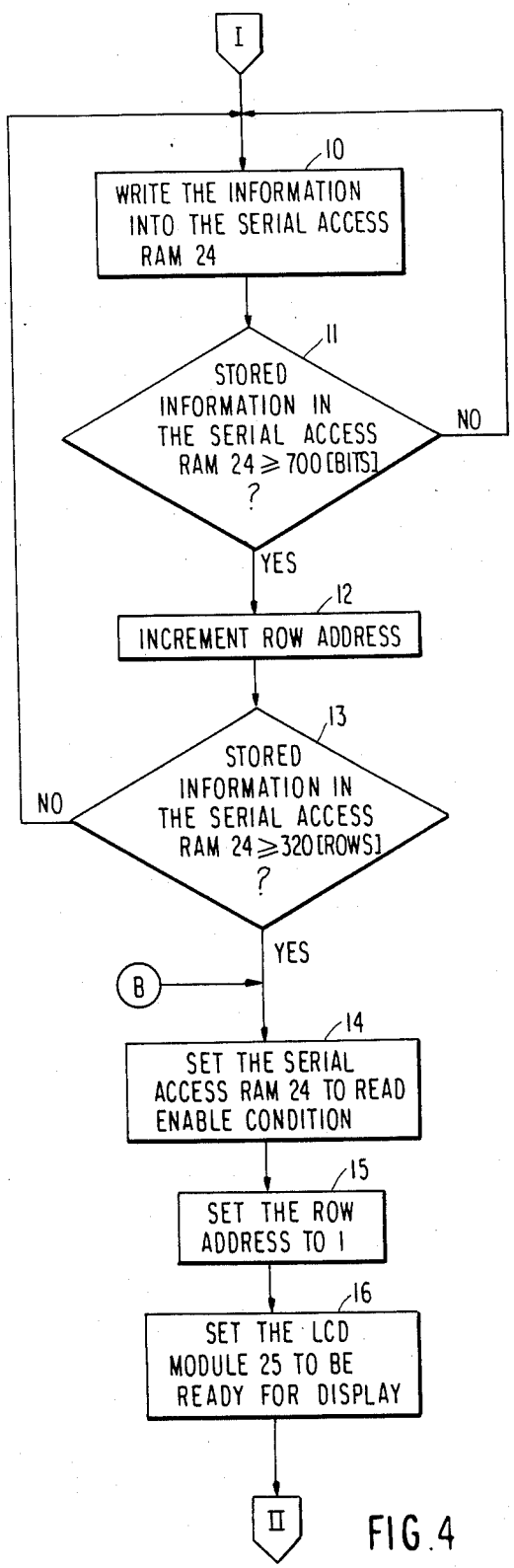
Figure 6:
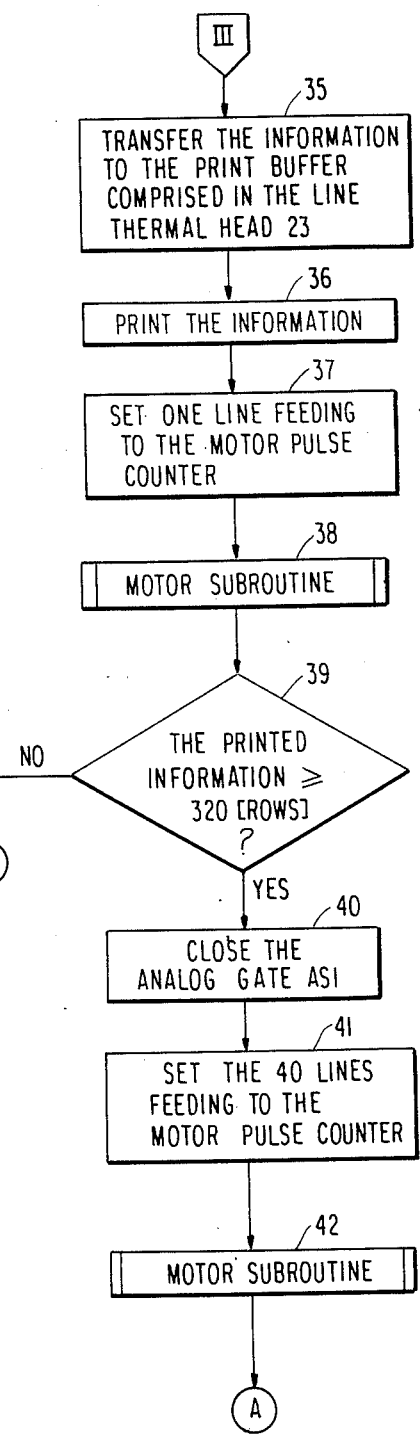
Figure 5:
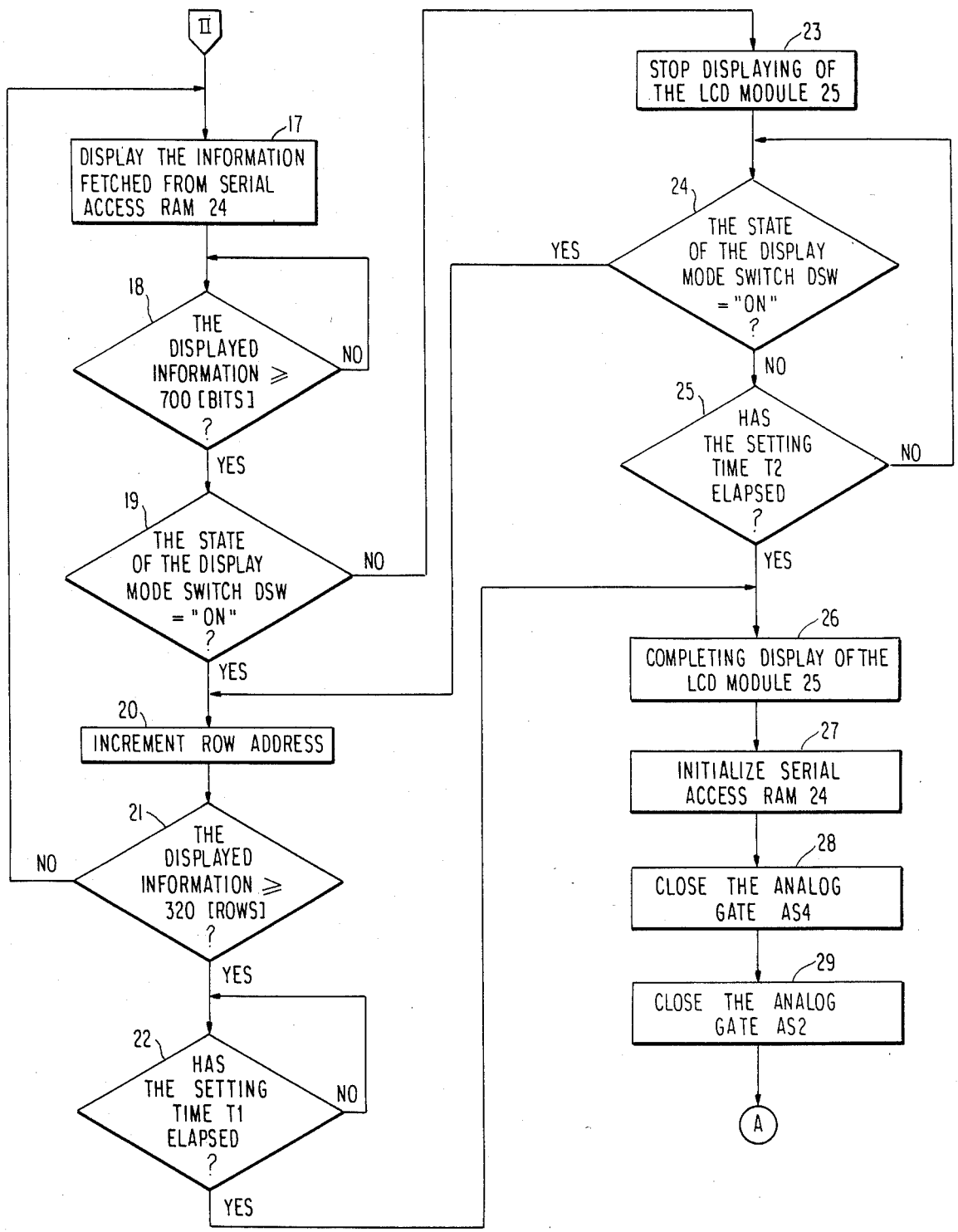
Figure 7:
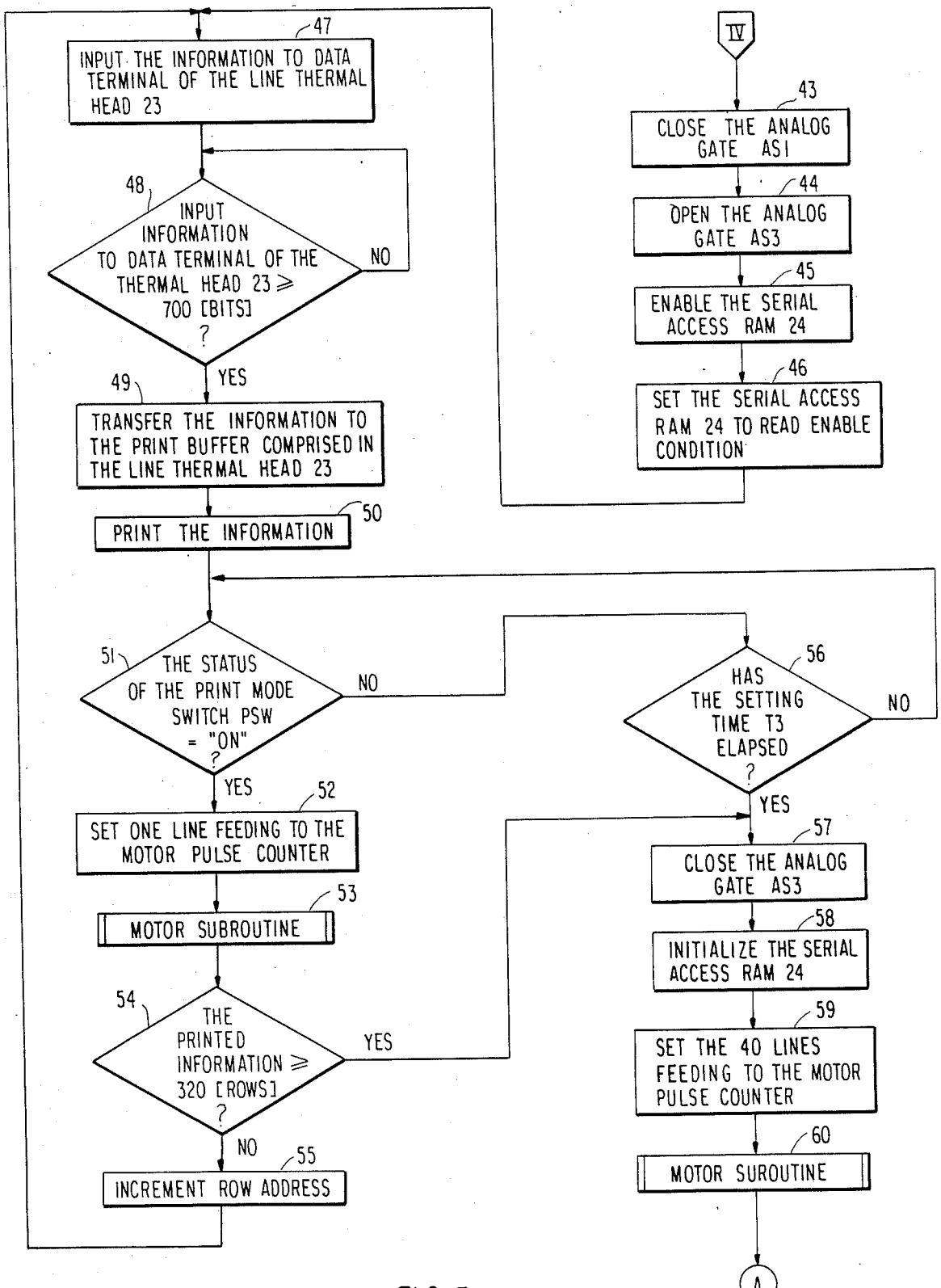

Turning first to FIGS. 1 and 2, a DC power source voltage is supplied to a DC—DC converter 1 which lowers a DC voltage from a car battery B through the main switch MS to obtain a DC output of $+C_{cc}$ in the facsimile apparatus illustrated in FIGS. 1 and 2. In addition, such DC power source voltage is also supplied to a voltage regulation circuit 2 and a DC—DC converter 3 through an ignition switch IG of the power supply system 5 of the vehicle itself in order to obtain a DC power supply $+V_p$ and $+V_M$ from the voltage regulation circuit 2. The output of the DC—DC converter 3 is applied to an AND gate along with the DC output $+V_{cc}$ of the DC—DC converter 1 whereby the output signal from the AND gate becomes an input signal for the microcomputer MPU. Namely, when the main switch MS and ignition switch IG are simultaneously ON to provide, respectively, outputs from the DC—DC converter 1 and the DC—DC converter 3, a signal "H" (high level signal) is input to the microcomputer MPU. As will be described later, if only the main switch MS is turned ON, only a line thermal head 23 and a step motor 26 will not operate in this embodiment, but other circuits will respectively function. Moreover, the entire facsimile apparatus, including the line thermal head 23 and step motor 26, function when the main switch MS and ignition switch IG are turned ON.

The microcomputer MPU is generally called a microprocessor or micom. The microcomputer MPU is driven by an oscillation circuit 4. When the main switch MS and ignition switch IG are simultaneously turned ON, the signal "H" is input to the input port (interrupt port) P1 of the microcomputer MPU through the AND gate, or when the ignition switch iG is OFF, a signal "L" (low level) is input thereto. The microcomputer is triggered by the rising edge of such signal and executes the interrupt routine which is described later. In addition, when the microcomputer MPU is being driven with a clock pulse from said oscillation circuit 4, the clock pulse (1 MHz) is output from the output port E.

The car radio receiver 10 may be any type of apparatus which is generally called a radio communicator or a radio receiver such as a mobile telephone, personnel radio, MCA radio, ACM system or bus location system. In this case a car radio receiver 10 is well known and therefore its description is simplified. Information propagated as a radio signal is received by an antenna ANT and only the particular frequency is selected by a tuning circuit 11. It is then amplified by a high frequency amplifying circuit 12. An output of a local oscillating circuit 14 is converted to a predetermined frequency by the high frequency amplified signal and an output of the local oscillating circuit 14 by a frequency converting circuit 13. Such predetermined frequency signal is amplified by an amplifying circuit 16 through a band pass filter BPF 15 as an information output.

The information output of said car radio receiver 10 is input to a modem 22 through a band pass filter BPF21 and demodulates the information signal transmitted as the radio signal. The modem 22 is well known as a modulator and demodulator of an ordinary wireless communication system or radio transmission system and therefore explanation of such is omitted here.

The information demodulated by said modem 22 is input to the line thermal head 23 through an analog gate AS1. Moreover, it is also input to a serial access RAM24 through an analog gate AS2. An output of said serial access RAM 24 is input to an LCD module 25, a liquid crystal display, through an analog gate AS4. Moreover, an output of said serial access RAM24 is input to the line thermal head 23 through an analog gate AS3.

The line thermal head 23 is a known direct recording apparatus for heat sensitive recording which records information on a heat sensitive recording paper by utilizing Joule's heat of resistance. An information output sent through the analog gate AS1 or analog gate AS3 is input to the DATA terminal, sequentially written to the comprised shift register by a clock pulse from the output port E of the microcomputer MPU which is input to the CK terminal, transferred at a time to the print buffer such as a latch circuit from said shift register by the rising edge of "H" at the LA terminal, and then printed at a time in unit of row on the head sensitive paper at the rising edge of "H" at the STR terminal. Printing density on the heat sensitive paper can be controlled with a pulse width for printing to the STR terminal. The heat sensitive paper for said line thermal head 23 is moved row by row by a two phase excitation and driving system step motor 26. An input of said step motor 26 is driven by a drive circuit consisting of transistors $Q_1$ to $Q_4$. For example, the table below summarizes the control by the signals from output P33 to output port P30 of the microcomputer MPU.

| Number of Steps | P33 | P32 | P31 | P30 |
|---|---|---|---|---|
| 1 | "H" | "L" | "H" | "L" |
| 2 | "H" | "L" | "L" | "H" |
| 3 | "L" | "H" | "L" | "H" |
| 4 | "L" | "H" | "H" | "L" |
| 5. | "H" | "L" | "H" | "L" |

The serial access RAM 24 stores the information demodulated by the modem 22 for every line of information by a serial signal through the analog gate AS2.

Namely the serial access RAM 24 has a memory capacity of 700 bits × 320 rows and it writes the data of row information from the D IN terminal in the write mode of "H" at the W/R terminal and outputs information from the D OUT terminal in the read mode of "L" at the W/R terminal. The row address is increased at the rising edge of "H" at the INC terminal and it is initialized at the rising edge of "H" of the CR terminal. Moreover, as the clock pulse of write mode and read mode, a pulse of 1 MHz is input to the CK terminal from the output port E of the microcomputer MPU.

The LCD module 25 is a liquid crystal display comprising a driving circuit for graphic display which is available on the market, having the display capacity of 700 bits × 320 rows. This LCD module 25 has terminals as illustrated in FIG. 1. An information input applied to the DATA terminal from the analog gate AS4 displays 700 dots of a line on the LCD module 25 with "H" at the HS terminal and makes a carriage return with "L" at the HS terminal. A single form of 700 bits × 320 rows of the LCD module 25 is displayed with "H" at the VS terminal. Display of a single format is completed with "L" at the VS terminal and the first line is displayed again. As the clock pulse input to the CK terminals, the pulse of 1 MHz is input from the output port E of the microcomputer MPU.

The output port P10 of microcomputer MPU controls a transistor Q5 for ON and OFF states through a resistor $R_3$ and switches the power supply circuit of the LCD module 25 for open and closed states. Namely, when the output P10 is in the "L" level, the transistor Q5 is turned OFF through the resistor $R_3$ and power source voltage is supplied to the LCD module 25 through a resistor $R_4$. In addition, when the output port P10 is in the "H" level, the transistor Q5 is turned ON, cutting off the power supply voltage of the LCD module 25.

The display mode switch DSW and print mode switch PSW are connected respectively to the input ports P23, P24 of the microcomputer MPU, however, when these are OFF the signal "H" is input to the input ports P23, P24 of the microcomputer MPU by the pull-up resistors $R_1$, $R_2$.

The total structure of said facsimile apparatus is installed as illustrated by the perspective view of the console of a vehicle as shown in FIG. 2.

In FIG. 2, a shift lever 30, front seats 31, and a center console box 32 are components which are generally provided for vehicles. An operation switch part 33 is provided with the main switch MS, display mode switch DSW and print mode switch PSW, etc. The LCD part 34 is a display part for displaying a single format of 700 bits×320 rows of the LCD module 25. The facsimile circuit having the circuit structure illustrated in FIG. 1 is located in portion 35 of the console.

The facsimile apparatus of the preferred embodiment of the present invention thus constituted is controlled and operated as described hereinafter.

FIGS. 3 to 7 show the flow charts of the main program of the microcomputer MPU for controlling the facsimile apparatus of the present invention.

First, the control for displaying a single format of the information transmitted as a radio signal on the LCD module 25 is explained in accordance with the "main routine".

For the following explanation it is assumed that the main switch MS and the ignition switch IG are simultaneously turned ON, the DC output $+V_{cc}$ and DC power supply $+V_p$, $+V$ are output from the DC—DC converter 1 and voltage regulating circuit 2, and output of the AND gate becomes "H" by the DC output $+V_{cc}$ of the DC—DC converter 3 and voltage regulating circuit 2 and the interrupt input port P1 of the microcomputer MPU is set to "H" level. Namely, it is a precondition that the interrupt command is not issued to the microcomputer MPU.

MAIN ROUTINE

In Step 01, the memory used in this system and the output ports are initialized.

In Step 02, whether the display mode switch DSW is ON or not is judged in order to discriminate the display mode.

In Step 03, whether the print mode switch PSW is ON or not is judged in order to discriminate the print mode. However, if both display mode switch DSW and print mode switch PSW are not in the ON state, processing of this routine does not start. When the display mode switch DSW is ON in Step 02, the output port P10 is set to "L", turning OFF the transistor Q5 in Step 04 and the power supply of LCD module 25 is turned ON.

In Step 05, the output port P14 is set to "H" level in order to open the analog gate AS4 and the output port P37 is set to "H" level in order to open the analog gate AS2.

In Step 07, whether information (H) is received or not is judged from the potential at the CA terminal of the modem 22. If information is received at modem 22, the output port P16 is set to "H" in Step 08 and the serial access RAM 24 is set to operable condition.

In Step 09 the output port P13 is set to "L" level and the serial access RAM 24 is set to programmable condition.

In Step 10 information is written into serial access RAM 24. Upon completion of writing as much as a single line of information into the serial access RAM 24 in Step 11, the output port P15 is immediately changed to level "L" from "H" in Step 12 and, in this case, the increment of the row address is one.

In Step 13 whether writing of information of 320 rows of a single format is completed or not is judged, and the operations from Step 10 to Step 13 are repeated until the end of writing of information of 320 rows. When it is judged that writing of 320 rows of information of a single format have been completed in Step 13 the output port P13 is set to "H" in Step 14, setting the serial access RAM24 to the ready state for reading.

In Step 15, output port P16 is changed from "L" to "H" to return the row address to 1.

In Step 16 output port P11 and output port P12 are set to "H", which sets the LCD module 25 to the "ready for display" state.

In Step 17 data is retreived from the D OUT terminal of the serial access RAM 24 to the DATA terminal of LCD module 25 through the analog gate AS4 and is displayed.

In Step 18 the display of information of a single line, 700 bits is judged, and when the display of a single line is completed, the continuation of the ON state of display mode switch DSW is judged. In Step 19 while the ON state of display mode switch DSW is continued the row address is caused to make an increment of 1 in Step 20.

In Step 21 the completion of the display of information of a single format of 320 rows is judged and operations from Step 17 through Step 21 are repeated until the end of the display of information of 320 rows. In Step 21 the judgement of the completion of display of information of a single format of 320 rows the passage of the display setting time T1 is judged in Step 22. When the passage of display setting time T1 is sensed in Step 22, the output port P10 is set to "H" in Step 26, turning OFF the transistor Q5 and completing display of the LCD module 25.

In Step 27 output port P16 is set to "L", initializing the serial access RAM 24.

In Steps 28 and 29, the output ports P14 and P37 are set to the "L" level, causing the analog gates AS4 and As2 to close.

The foregoing explanation corresponds to the display of a single format of the information transmitted as the radio signal to the LCD module 25. The control executed in case the information transmitted is not retreived after the display of the particular rows is then explained hereinafter.

When display is carred out up to a particular row and a driver judges it is no longer necessary to receive successive information based on such displayed information, the driver turns OFF the display mode switch DSW. The OFF state of the display mode switch DSW is based on the judgement in Step 19. Namely, it is realized by setting the output port P11 to the "L" level in Step 23 and suspending display of the LCD module 25.

However, when the driver turns the display mode switch DSW ON again it is judged in Step 24, the row address is caused to make an increment of 1 again in Step 20 and the operations from Step 17 to Step 21 are repeated until the end of display of information of a single format of 320 rows.

If the display mode switch DSW is not turned ON repeatedly by the driver, the information which has been displayed on the LCD module 25 is displayed only for the display setting time T2 which is preset in Step 25. When passage of display setting time T2 is judged, the output port P10 is set to the "H" level in Step 26, turning OFF the transistor Q5 and completing display on the LCD module 25. In Step 27, output port P16 is set to the "L" level, initializing the serial access RAM24. In Steps 28 and 29, output ports P14 and P37 are set to the "L" level to close the analog gates AS4 and AS2.

The foregoing explanation is based on the precondition that the information has reached modem 22, but if information has not yet reached modem 22 operations are as follows.

In Step 07 it is judged whether the received information exits ("H" level) at the CA terminal of modem 22. When there is no received information at modem 22, output port P13 is set to the "H" level in Step 14 in order to set the serial access RAM24 to the "ready for reading" state. Namely, in case information has not yet reached modem 22 when display mode switch DSW is turned ON, the information stored in the serial access RAM24 is read. More specifically, the processing of routines from Step 14 to Step 29 are carried out. Therefore, even in this case, display can be suspended at the particular row and display of one format. The processing of routines from Step 14 to Step 29 have been explained above and therefore such explanation is not repeated here.

When display mode switch DSW is turned OFF and the print mode switch PSW is turned ON the following controls are carried out.

When it is judged that display mode switch DSW is turned OFF in Step 02 and the print mode switch PSW is turned ON in Step 03, output port P36 is set to the "H" level in Step 31, opening analog gate AS1.

In Step 32, it is judged whether received information exists ("H" level) in CA terminal of modem 22. When received information exists at modem 22, the information is input to the DATA terminal of line thermal head 23 through the analog gate AS1 from the RD terminal of modem 22 in Step 33.

In Step 34, the end of information of a single line, 700 bits is judged in Step 34 and when information of a single line, 700 bits is completed, output port P35 is set from the "H" level to the "L" level in Step 35, transferring the print information to the print buffer in line thermal head 23.

In Step 36, output port P34 is changed from the "H" level to the "L" level and the print information of the print buffer is output to the heat sensitive paper with printing density corresponding to such pulse width.

In Step 37, 1 is set to motor pulse counter and in Step 38 the processing of the "motor subroutine" starts. The heat sensitive paper is moved as much as a single line (one step) by the processing of the "motor subroutine".

In Step 39, the completion of printing and recording of 320 rows corresponding to a single format is judged. If it is not yet completed, the processes from the retreiving of information in Step 33 to Step 39 are repeated. In Step 39, when it is judged that recording by printing of 320 rows corresponding to a single format is completed, output port P36 is set to the "L" level in Step 40 and the analog gate AS1 is closed.

In Step 41 a value 40, which is calculated from a rotating angle of step motor 26, which corresponds to the distance sufficient for exhausting the heat sensitive paper, is set to the motor pulse counter and in Step 42 the processing of the "motor subroutine" starts and thereby the heat sensitive paper is exhausted from the line thermal head 23.

The foregoing explanation applies when information is transmitted when the print mode switch PSW is turned ON. However if there is no received information in modem 22, even when the print mode switch PSW is ON, controls are executed as follows.

When it is judged that there is no received information in the CA terminal of modem 22 in Step 32, output port P36 is set to the "L" level in Step 43, the analog gate AS1 is closed, the output port P17 is set to the "H" level in Step 44, and the analog gate AS3 is opened.

In Step 45 the output port P16 is set to the "H" level and the serial access RAM24 is set to the "ready for operation" state.

In Step 46 the output port P13 is set to the "H" level and serial access RAM24 is set to the "ready for reading" state. In Step 47 information is input to the DATA terminal of line thermal head 23 through the analog gate AS3 from the D OUT terminal of serial access RAM24.

In Step 48 the end of information of a single line, 700 bits is judged and when the information of a single line, 700 bits terminates, the output port P35 is changed from the "H" level to the "L" level in Step 49 and the print information is transferred to the print buffer in line thermal head 23.

In Step 50 output port P34 is set from the "H" level to the "L" level and the print information of the print buffer is output to the heat sensitive paper in a printing density corresponding to the pulse width.

In Step 51 it is judged whether print mode switch PSW is turned ON continuously or not. When ON state of print mode switch PSW is continued, 1 is set to the motor pulse counter in Step 52 and the processing of the "motor subroutine" starts in Step 53. The heat sensitive paper is moved for a single line (one step) by the processing of the "motor subroutine'.

In Step 54 the completion of the recording by printing of 320 rows corresponding to a single format is judged. If it is not completed the row address is incremented 1 in Step 55 and the operations from Steps 47 to 55 are repeated until the display of information of 320 rows of a single format is completed in Step 54.

In Step 54 if the recording by printing of 320 rows corresponding to a single format is judged to have been completed, output port P17 is set to the "L" level in Step 57, closing analog gate AS3.

In Step 58, output port P16 is set to the "L" level, initializing serial access RAM24. A value 40, calculated from a rotating angle of the step motor 26 corresponding to the distance which exhausts the heat sensitive paper, is set to the motor pulse counter in Step 59 and the processing of the "motor subroutine" starts in Step 60 and the heat sensitive paper is exhausted from the line thermal head 23.

The foregoing explanation applies when there is no transmission of information and to the control operations when the print mode switch PSW is continuously turned ON. In this case information corresponding to a single format sent from the serial access RAM 24 is recorded and exhausted from line thermal head 23. However, when the print mode switch PSW is turned OFF for the predetermined period T3 while information sent from serial access RAM24 is being recorded by line thermal head 23, the following processes are carried out.

When it is judged that the input port P24 is in the "L" level in Step 51 information recording processing from Step 43 to Step 50 is suspended and whether the OFF state of the print mode switch PSW continues for the predetermined period T3 or not. If the OFF state of the print mode switch PSW does not continue for the predetermined period T3 and switch PSw is turned ON again in Step 56, operation Step 51 is transferred to Step 52, and as a result, information corresponding to a single format sent from the serial access RAM24 is recorded and exhausted by line thermal head 23 by the information recording processes from Step 47 to Step 60, as explained above.

In Step 56 when it is judged that the OFF time of print mode switch PSW has continued for predetermined period T3, output port P17 is set to the "L" level and analog gate AS3 is closed in Step 57. Output port P16 is set to the "L" level and serial access RAM24 is initialized in Step 58.

In Step 59 a value 40, which is calculated from a rotating angle of step motor 26 corresponding to a distance sufficient for exhausting the heat sensitive paper is set to the motor pulse counter and in Step 60, the processing of the "motor subroutine" starts and the heat sensitive paper is exhausted from the line thermal head 23. When the OFF time of print mode switch PSW continues for predetermined period T3, recording of information stored in serial access RAM24 is suspended and the heat sensitive paper being sent to line thermal head 23 for information storing can be exhausted therefrom.

The foregoing operations have been explained based on the assumption that the main switch MS and ignition switch IG are simultaneously turned ON, a DC output $+V_{cc}$, DC power source voltages voltages $+V_p$, $+V_M$ are output respectively from the DC—DC converter 1 and the voltage regulating circuit 2, an output $+V_{cc}$ of the DC—DC converter 3 and the voltage regulating circuit 2, the interrupt input port P1 of the microcomputer MPU is set to the "H" level and an interrupt command is not issued to the microcomputer MPU. However, when the main switch MS only is ON and the ignition switch IG is OFF, the DC output $+V_{cc}$ is output from the DC—DC converter 1, and output of the AND gate becomes "L" and thereby the interrupt input port P1 of the microcomputer MPU is set to the "L" level. That is, the microcomputer MPU has accepted an interrupt command.

Figure 8:
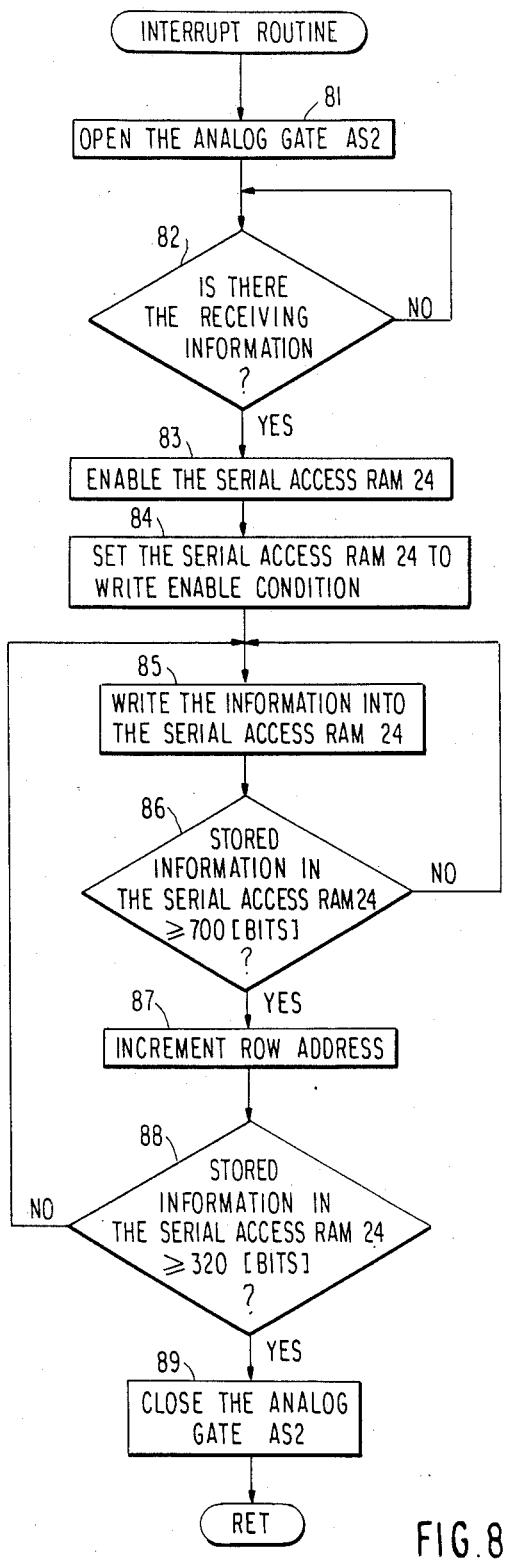
FIG. 8 is a flowchart of the "interrupt routine" of microcomputer MPU for controlling the facsimile apparatus of the present invention.
Figure 9:
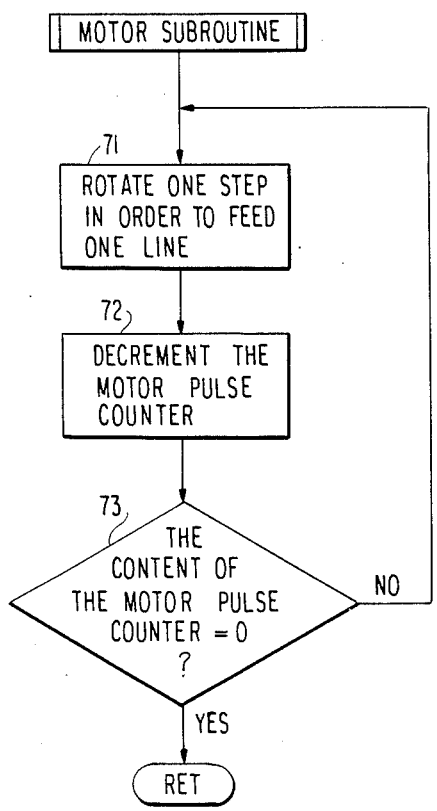
FIG. 9 is a flowchart of a "motor subroutine" of a step motor of the facsimile apparatus of the present invention.

In this case the processing of the "interrupt routine" illustrated in FIG. 8 starts.

INTERRUPT ROUTINE

In the "interrupt routine" output port P37 is set first to the "H" level in Step 81, opening analog gate AS2. In Step 82, the receiving condition of modem 22 is judged from the state of the CA terminal of modem 22. When the CA terminal of modem 22 is "L" and modem 22 is not in the receiving condition in Step 82, operation waits until the CA terminal of modem 22 becomes the condition for receiving information of "H" level in Step 82. When modem 22 enters the information receiving state, output port P16 is set to the "H" level in Step 83 thus setting serial access RAM24 to the "ready for operation" state.

In Step 84 output port P13 is set to the "L" level, setting serial access RAM24 to the "ready for writing" state.

In Step 85 information is written into serial access RAM24. When the entry of information of as much as a single line to serial access RAM24 has been completed in Step 86, output port P15 is switched once from the "H" level to the "L" level in Step 87 causing the row address to increment by 1.

In Step 88 the completion of entry of information of a single format, 320 rows, is judged and the operations from Step 85 to Step 88 are repeated until the end of entry of information of 320 rows. In Step 88 when it is judged that the entry of information of a single format, 320 rows, has been completed, output port P37 is set to the "L" level, closing the analog gate AS2 and terminating the "interrupt routine" in Step 89.

The "motor subroutine" for driving the stepping motor is controlled as follows.

MOTOR SUBROUTINE

When the processing of the "motor subroutine" starts in Steps 28, 42, 53 and 60, the step motor 26 rotates one step in Step 71 and the motor pulse counter makes a decrement of 1 in Step 72.

In Step 73 it is judged whether a value of motor pulse counter is "0" or not and the processing from Step 71 to Step 73 is repeated until the motor pulse counter value becomes "0". When the motor pulse counter value becomes "0", the processing of the "Motor subroutine" terminates and the processing of the "main program" starts.

In the foregoing embodiment of the facsimile apparatus of the present invention which is mainly comprised of a car radio receiver 10, a modem 22, a line thermal head 23, a serial access RAM24, and LCD module 25, a step motor 26 and a microcomputer MPU, a facsimile apparatus control program is used such that both main switch MS and ignition switch IG are turned ON simultaneously and the DC output $+V_{cc}$ DC power source voltages $+V_P$, $+V_M$ are output from the DC—DC converter 1, and the voltage regulating circuit 2 is programmed differently from a facsimile apparatus control program used in the case when only the main switch MS is ON and the ignition switch IG is OFF, a DC output $+V_{cc}$ is output from the DC—DC converter 1.

Figure 10:
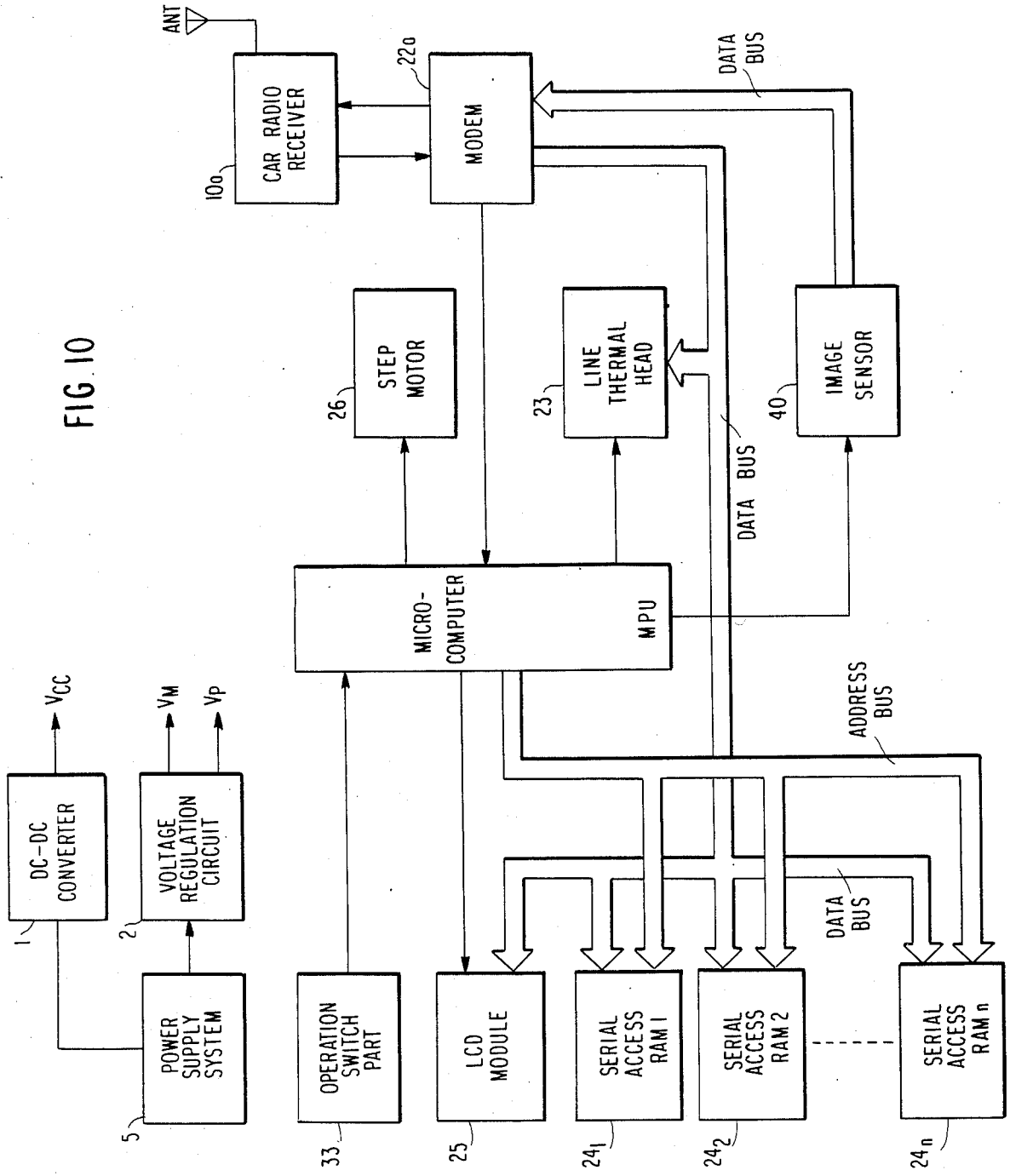
FIG. 10 is a block diagram of a facsimile apparatus according to another embodiment of the present invention.

In the embodiment of FIG. 1 only one serial access memory RAM24 having a storing capacity of 700 bits×329 rows is used, but, as shown in the block diagram of the total structure of the facsimile apparatus of another embodiment of the present invention as shown in FIG. 10, (in FIG. 10, like numerals and symbols, such as those in FIG. 1, indicate like elements), a plurality of serial access memories RAM24 each with a capacity of 700 bits×320 rows may be used as the serial access memories RAM1 RAMn in view of increasing the memory capacity.

The embodiment of FIG. 1 has been explained on the basis of the precondition for the receiving operation of the facsimile apparatus, but, of course, it is possible, as shown in the block diagram of the total structure of the facsimile apparatus of another embodiment of the present invention as shown in FIG. 10, that an image sensor 40 can be added for obtaining read and send functions and thereby such an apparatus can be used as the facsimile apparatus for information transmission and reception. In this case, the modem 22 is used as the modulator/demodulator 22a and the car radio receiver 10 is used as the car radio transceiver 10a.

The communication terminal and modem of said embodiment are formed, respectively, by a car radio receiver 10 and a modem 22, but a wireless or radio communication terminal may be used in the present invention in accordance with the communication system employed. However, it is possible to receive stable and high level information particularly when a wireless communication system is employed, but when the content of the received information is distributed in accordance with a propagation system like a radio communication system, the signal can be used as the output of recording means only when the receiving condition is good. Therefore the communication terminal of the present invention provides a remarkable effect when the radio communication is employed. But the present invention is not limited only to such systems and the wireless communication terminal can also be employed. In addition, the modem 22 generally provides the function of modulator and demodulator, but since the technical means of the present invention exists for the processing of demodulated information, modems may be used which can function for modulation/demodulation and demodulation.

The display means displaying received information in the above embodiments uses an LCD module 25 for a display means using a liquid crystal, and said display means using a liquid crystal is selected in view of decreased power consumption. However, in the present invention, it is possible to use an LED module consisting of a light emitting diode, although power consumption is slightly increased.

The memory means which stores said received information in the above embodiments uses a serial access RAM24 as a fixed memory, but in the present invention such memory may be replaced with a magnetic disk or magnetic tape, etc. However the fixed memory of said embodiments consumes less electrical power and realizes a reduction in size.

The recording means which records received information in the above embodiments uses a line thermal head 23 which uses heat sensitive paper because of small size, easy operation and low cost, but any direct recording system, for example a heat sensitive recording or ink jet recording, etc., or indirect recording system, for example, and optical recording system or electrostatic recording system may be employed in the present invention.

In the above embodiments since a switch means selects the driving of the memory means, display means and recording means, the selection of memory means, display means and a recording means is carried out depending on the condition that both the main switch MS for the facsimile apparatus and the ignition switch IG of the vehicle are turned ON simultaneously, or only the main switch MS of the facsimile apparatus is turned ON, but this application mode corresponds to energy saving when a driver is absent from the vehicle. However, when the facsimile apparatus is installed in premises other than a movable one such as a vehicle, said switch means can be modified variously in accordance with application purposes. Even in a vehicle, operation of the ignition switch IG is not considered as a precondition and attendance or absence of the driver is judged by other sensors. When a driver is absent, operation of the memory means, display means and recording means can be suspended.

Moreover, in the above embodiments, since the switch means selects driving of the memory means, display means and recording means, the selection for the facsimile control program is carried out which is applied when the DC $+V_{cc}$ and DC power source voltages $+V_P$, $+V_M$ are output from the DC—DC converter 1 and the voltage regulating circuit 2 and the facsimile control program which is applied when a DC output $+V_{cc}$ is output from the DC—DC converter 1 when only the main switch MS is ON and the ignition switch IG is OFF are prepared as different programs. But since judgement for both programs is executed in accordance with the "H" or "L" level of the simplified output or input, such judgement can be easily realized with apparatus other than the microcomputer MPU.

The facsimile apparatus of the present invention comprises a memory means which stores received information demodulated by the modem, a display means which displays said received information, a recording means which records said received information and a switch which selects the driving of said memory means, display means and/or recording means and is capable of economically using recording paper, etc., because output of unwanted received information, including received information when the receiving condition from the recording means is poor, can be inhibited by selection of the switch means after confirming the receiving condition with the display means displaying the received information. In addition, under the ordinary reception waiting condition, the electrical power consumped can be minimized by setting only the memory means which stores the demodulated received information to the operating condition. Since the received information can also be confirmed with a power saving type display means using liquid crystal, the present invention can be used as an energy saving type facsimile apparatus.

While the invention has been particularly shown and described with reference to preferred embodiments thereof it will be understood by those in the art that the foregoing and other changes in form and details may be made therein without departing from the spirit and scope of the invention.

What is claimed is:

1. A facsimile apparatus comprising:
   information signal receiving means,
   demodulation means connected to said receiving means which demodulates said signal to provide received information,
   memory means connnected to said demodulation means which stores received information demodulated by said demodulation means,
   display means connected to said memory means which displays received information demodulated by said demodulation means,
   recording means connected to said memory means and said demodulation means which records received information demodulated by said demodulation means,
   electronic control means which controls operation of said memory means, display means and recording means,
   first power supply means which supplies electrical power to said memory means and display means, and
   second power supply means which supplies electrical power to said recording means,
   wherein said control means provides an operation selection means which selectively operates said memory means, display means and recording means and said operation selection means provides a driver detection means which detects absence of a driver.

2. A facsimile apparatus as defined in claim 1 wherein a plurality of said memory means are provided.

3. A facsimile apparatus as defined in claim 1 wherein said memory means is a serial access RAM.

4. A facsimile apparatus as defined in claim 1 wherein said display means is a two dimensional display.

5. A facsimile apparatus as defined in claim 1 wherein said display means is a liquid crystal display.

6. A facsimile apparatus as defined in claim 1 wherein said recording means is a dot printer.

7. A facsimile apparatus as defined in claim 1 wherein said recording means is a thermal printer.

8. A facsimile apparatus as defined in claim 1 wherein wherein said control means comprises a microcomputer.

9. A facsimile apparatus as defined in claim 1 comprising a memory reset means which resets the operations of said memory means as required.

10. A facsimile apparatus as defined in claim 1 comprising a display reset means which resets as required the operations of said display means.

11. A facsimile apparatus as defined in claim 1 comprising a recording reset means which resets the operations of said recording means as required.

12. A facsimile apparatus as defined in claim 11 wherein said operation selection means suspends operation of said recording means when said driver detection means detects the absence of a driver.

13. A facsimile apparatus as defined in claim 11 wherein said driver detection means is an ignition switch of a vehicle.

14. A facsimile apparatus as defined in claim 1 comprising a main switch which controls said first power supply means.

15. A facsimile apparatus as defined in claim 1 comprising a subswitch which controls said second power supply means.

16. A facsimile apparatus as defined in claim 15 wherein said subswitch is an ignition switch of a vehicle.

17. A facsimile apparatus as defined in claim 1 comprising a housing which encloses said demodulation means, memory means, display means, recording means, control means, first power supply means and second power supply means.

18. A facsimile apparatus as defined in claim 17 wherein said housing is arranged in a center console box of a vehicle.

* * * * *

UNITED STATES PATENT AND TRADEMARK OFFICE
CERTIFICATE OF CORRECTION

PATENT NO. : 4,796,091

DATED : January 3, 1989

INVENTOR(S) : Hiroshi NOHTOMI

It is certified that error appears in the above-identified patent and that said Letters Patent is hereby corrected as shown below:

On the title page;

[73] Assignee: Aisin Seiki Kabushiki Kaisha
Kariya City, Japan

Signed and Sealed this

Third Day of July, 1990

*Attest:*

*Attesting Officer*

HARRY F. MANBECK, JR.

Commissioner of Patents and Trademarks